United States Patent [19]
Reid

[11] Patent Number: 5,248,417
[45] Date of Patent: Sep. 28, 1993

[54] DOUBLE FLOW-THROUGH FILTRATION APPARATUS

[76] Inventor: Roger P. Reid, 1907 Alder, Caldwell, Id. 83605

[21] Appl. No.: 970,388

[22] Filed: Nov. 2, 1992

[51] Int. Cl.$^5$ .............................................. B01D 24/18
[52] U.S. Cl. ............................ 210/195.1; 210/257.1; 210/288; 210/289; 210/134; 210/136
[58] Field of Search ................... 210/767, 257.1, 257.2, 210/288, 321.69, 769, 195.1, 136, 134, 295, 807, 288, 289, 257.1, 195.1

[56] References Cited

U.S. PATENT DOCUMENTS

| | | | |
|---|---|---|---|
| 3,542,199 | 11/1970 | Bray | 210/136 |
| 3,654,148 | 4/1972 | Bradley | 210/257.2 |
| 3,734,295 | 5/1973 | Smith | 210/288 |
| 3,753,495 | 8/1973 | Bjork | 210/288 |
| 4,804,465 | 2/1989 | Brown | 210/288 |
| 4,882,061 | 11/1989 | Petrucci et al. | 210/257.2 |
| 5,017,286 | 5/1991 | Heiligman | 210/288 |
| 5,082,557 | 1/1992 | Grayson et al. | 210/257.2 |

Primary Examiner—Robert A. Dawson
Assistant Examiner—Ana M. Fortuna
Attorney, Agent, or Firm—Paul F. Horton

[57] ABSTRACT

Double flow-through filtration apparatus requiring the bulk of the water to be treated to twice flow through filtering media contained within a filter housing. The housing includes an inlet port for receiving water from a source; a combination port for water flow to and from a storage tank and an outlet port which may lead to a water tap. Untreated water from a source flows into the filter housing through the inlet port. A cup type check valve prevents flow directly to the storage tank, forcing the water through the filter media for a first treatment. A filter tube, extending through the media, in cooperation with a check valve of the slip type, permits once treated water to flow to a storage tank and prevents backflow into the tube. Once the water tap is opened, the once treated water flows form the storage tank, through the combination port, by the cup valve, and through the filter media a second time before exiting the outlet port of the housing and the tap.

5 Claims, 1 Drawing Sheet

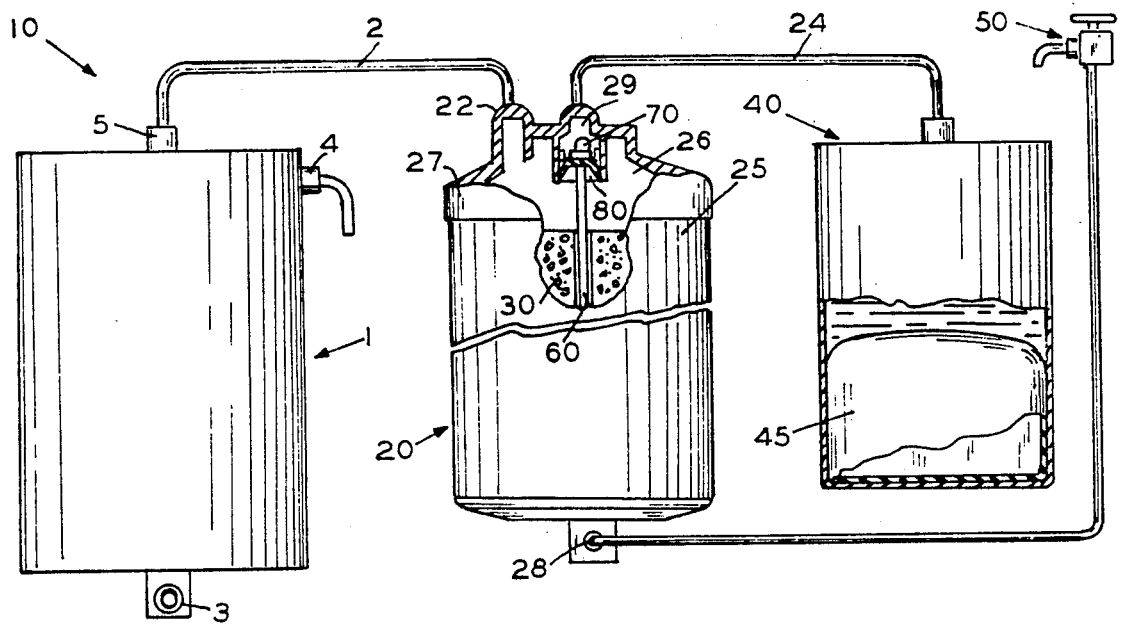
FIG.1
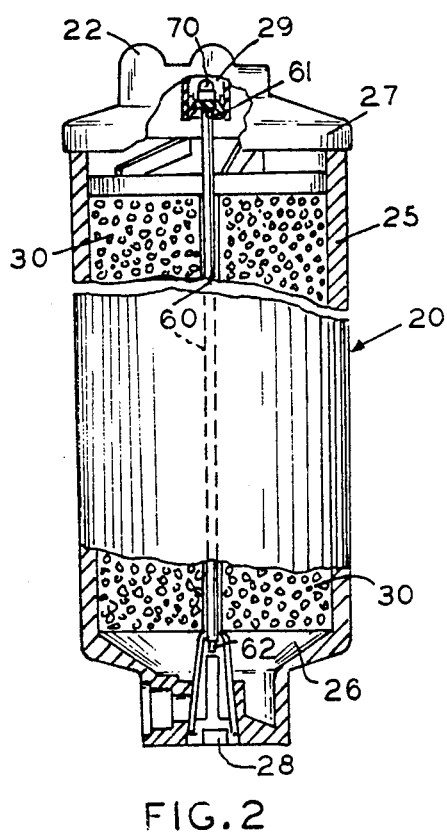
FIG.2
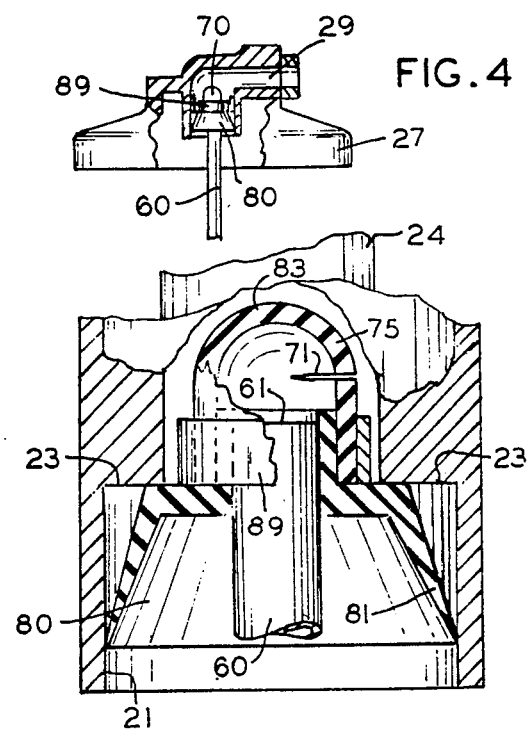
FIG.3
FIG.4

DOUBLE FLOW-THROUGH FILTRATION APPARATUS

BACKGROUND OF THE INVENTION

1. Field of the Invention

This invention relates to water filtration apparatus.

2. Description of the Prior Art

Conventional water filters permit a single flow though of the media for treatment of water. Problems may result where water flow is high, where amount of filtering media is minimal or where the filtering media does not have sufficient time in which to adsorb, react with, or otherwise treat the water.

SUMMARY OF THE INVENTION

The present invention permits greater water treatment per amount of filtering media by providing double flow through filtration apparatus. The apparatus of the present invention includes, generally, a water source; a filter housing; filter media contained within the housing; a flow tube extending through the media; a storage tank; and valve members requiring the source water to flow through the media to the storage tank and to again flow through the filter media as it exits the housing.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 1 is a schematic view showing the double flow-through water filtration device of the present invention as attached to a reverse osmosis device, used as a water source.

FIG. 2 is a sectional view of the filter.

FIG. 3 is an enlarge view showing the cup valve and slip valve of the present invention.

FIG. 4 is a side sectional view of the combination port and upper housing of the present invention.

DETAILED DESCRIPTION OF THE INVENTION

Referring to FIG. 1, a schematic view of double flow through water filtration apparatus 10, made according to the present invention is disclosed. Apparatus 10 includes, generally, a water source 1, a water filter 20; a storage tank 40; and a water tap 50.

While water source 1 may be any conventional water source, it is contemplated that a reverse osmosis water source will most likely be used with filter 20 of the present invention. Reverse osmosis units are old in the art of water purification, as shown and as typified by the purifier of J. D. Kirshmann, U.S. Pat. No. 4,218,317. Such purifiers produce purified water at a very slow and at what may be called a drip rate. Such purifiers are generally provided with a water inlet 3, a brine outlet 4, and a purified water outlet 5.

Water from source 1 is passed through a conduit 2 to water inlet port 22 of water filter 20. Water filter 20 includes a water-tight housing constructed of any suitable material, defining an internal cavity 26 operable to hold filter media 30, preferably of cartridge construction for ready removal and replacement through a threaded cap structure 27, shown in FIG. 2. Housing 25 defines, besides inlet port 22, a water outlet port 28 and a combination water inlet-outlet port 29. Each of the ports may be provided with quick connect fittings, as is preferred, or conventional threaded fittings. While the fittings are shown located at an angle of ninety degrees relative to the longitudinal axis of housing 25, such angular disposition is arbitrary.

Combination port 29 is in fluid communication with storage tank 40 by means of conduit 24 to allow water to flow to and from tank 40 through port 29. Tank 40 may be provided with an air bladder 45, air pocket, pump, or other displacement means for forcing water back into the filter housing.

Located between inlet port 22 and outlet port 28 and also between combination port 29 and the outlet port so as to require water flow therethrough is filter media 30. The media may include activated carbon or alumina; ion exchange resins; granular calcium carbonate; polyphosphate crystals; or any other media serving to take material from the water; add material to the water; change the pH of the water; or other well-known functions. While encapsulating a granular media within internal cavity 26 is preferred, the media may also be in the form of molded briquettes, and the like.

Extending through media 30 is an elongated filter tube 60, having a top opening 61 adjacent combination port 29 and a bottom opening 62, located below filter media 30, as may be seen in FIGS. 1-3. Media 30 is preferably encapsulated to define a hollow core through which filter tube 60 extends. Filter tube 60 carries water which has flowed from water source 1, through inlet port 22, and downward through filter media 30, to combination port 29 and hence to storage tank 40.

To prevent water flow from source 1 from directly entering the storage tank and to prevent backflow of water from the storage tank through filter tube 60, a pair of check valves 70 and 80 are employed, as shown to advantage in FIG. 3, taken with the other figures.

A first check valve 70 is preferably of the reed or slip valve type and is used to prevent backflow from storage tank 40 to the filter tube 60. While, obviously, other types of check valves may be used, a slip valve, because of its simplicity and lack of mechanical parts is preferred. The valve shown includes a flexible member 75, made of rubber or the like, disposed between filter tube 60 and combination port 29. Member 75 defines a small tube or slit 71, biased by the flexible material into a normally closed position. Only when the water pressure within filter tube 60 exceeds the pressure at the combination port, does the valve open to allow water to exit the filter tube and flow into the storage tank through combination port 29 and conduit 24. In preventing backflow of water through the filter tube, all water within storage tank 40 can exit outlet port 28 of housing 25 only by flowing through valve 80 and once again through filter media 30.

A second check valve 80, preferably of the cup type, prevents water from entering tank 40 directly from the top portion of cavity 26 of the housing, and thereby forces flow through filter media 30 and into the bottom opening 62 of filter tube 60. While other check valves may also be used, the cup valve is again preferred because of simplicity and a minimum of working parts. Cup valve 80 is also constructed of flexible material and includes a circular flange or wing 81, self biased in the closed position in engaging and seating against the internal wall of round bore 21 defined by the housing. When the water pressure within the top portion of cavity 26, above media 30, is equal to or exceeds the pressure at port 29 and hence tank 40, valve 80 remains in a closed position preventing flow from the top portion of the cavity to the tank, thus requiring water to flow downwardly through filter media 30 and into the filter tube, for a first treatment of the water. In the embodiment shown, and as is preferred, valves 70 and 80 may be of unitary construction, being formed as a single unit. To prevent disengagement from tube 60, the valve unit is provided with a hollow dome 83 fitting over the top opening of tube 60. Shoulders 23 of housing 25 prevent upward disengagement and a squeeze ring 89 also seals and secures the valve onto tube 60.

Treated water, having twice passed through media 30, flows through outlet port 28. Preferably connected to port 28 is a conventional water tap or faucet 50 for controlling flow of water coming from the filter and for providing an easily accessible outlet from the filter.

In operation, water flows from source 1, through conduit 2 and into the top cavity 26 of housing 25 through the inlet port 22. Water, coming from a reverse osmosis device, as shown in FIG. 1, flows at a slow rate. Assuming tap 50 is in the closed position, water will flow, for a first treatment, through media 30, into the bottom opening 62 of filter tube 60 and thence out through check valve 70, through combination port 29 and into storage tank 40. Once tap 50 is opened, water flows from the storage tank, through check valve 80; once again through the media 30 for a second treatment, out port 28 and on through tap 50. A very small quantity of water may flow a single time through the media from source 1, during this procedure.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Water filtration apparatus comprising:
    a water source;
    a water storage tank; and
    a water filter including
        a water tight housing defining an internal cavity; said housing including an inlet port in fluid communication with said water source; an outlet port; and a combination inlet-outlet port in fluid communication with said storage tank;
        filter media located within and filling a central portion of said housing cavity;
        an elongated filter tube extending through said filter media, said tube having a top opening connected to said combination port and a bottom opening below said filter media for conducting water, once filtered, to said storage tank;
        a first check valve for allowing water flow to said storage tank from said filter tube and for preventing back flow of water from said storage tank to said filter tube; and
        a second check valve for preventing water flow from a top portion of said housing cavity to said storage tank and for allowing once filtered water to flow from said storage tank to said cavity; through said filter media; and to said outlet port for double filtration of water flowing from said outlet port.

2. The apparatus as described in claim 1, further comprising a water tap connected to said outlet port for controlling water flow through said apparatus.

3. The apparatus as described in claim 1 wherein said filter media is encapsulated, defining an elongated hollow core and wherein said filter tube extends through said core.

4. The apparatus as described in claim 1 wherein said first check valve is a flexible slip valve.

5. The apparatus as described in claim 1 wherein said second check valve is a flexible cup valve.

* * * * *